Figure 16:
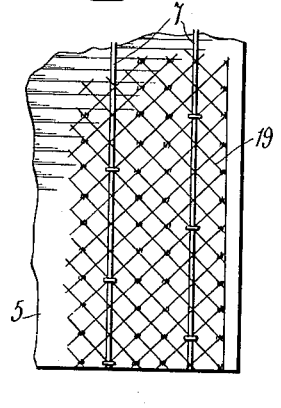

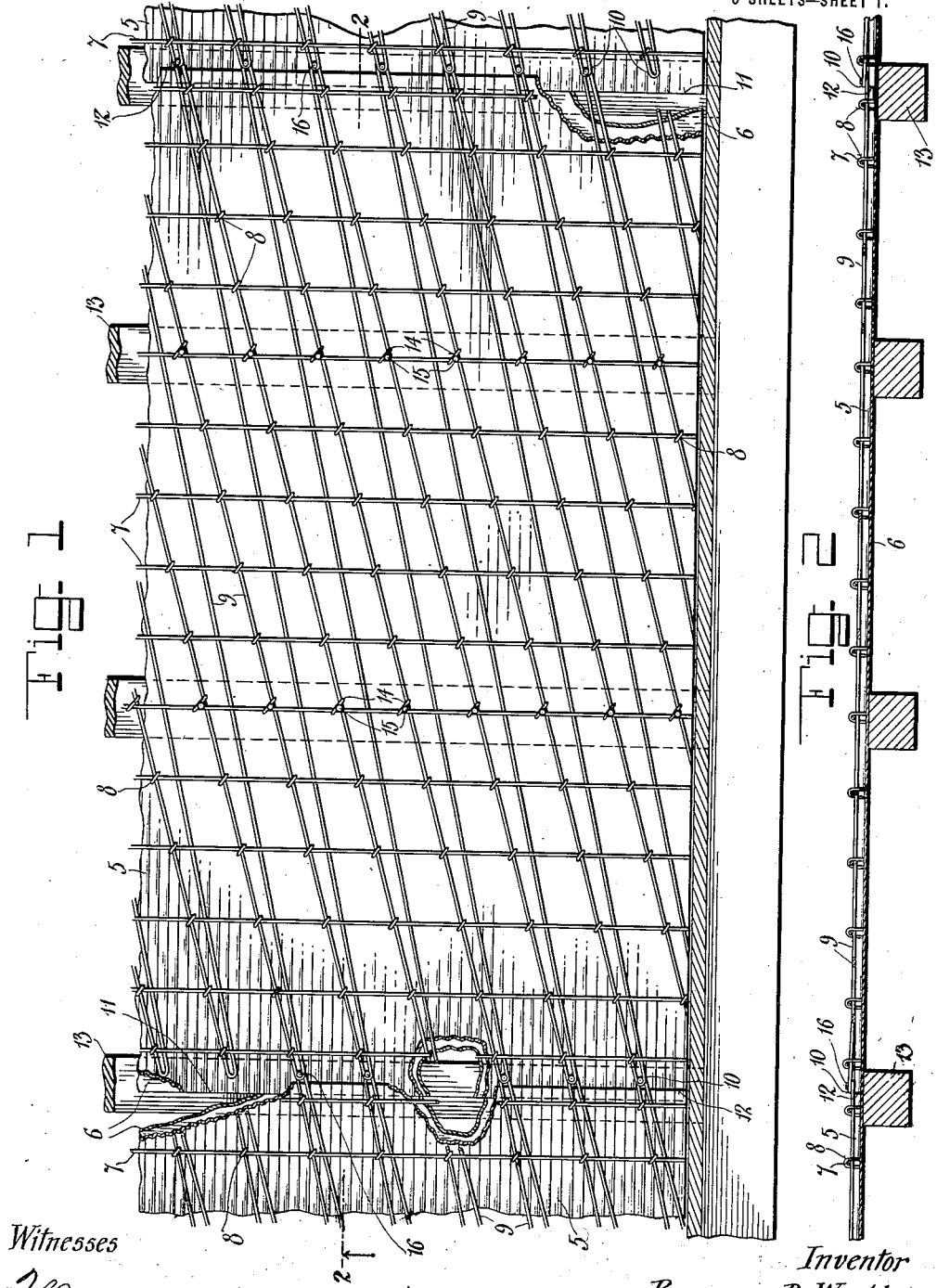

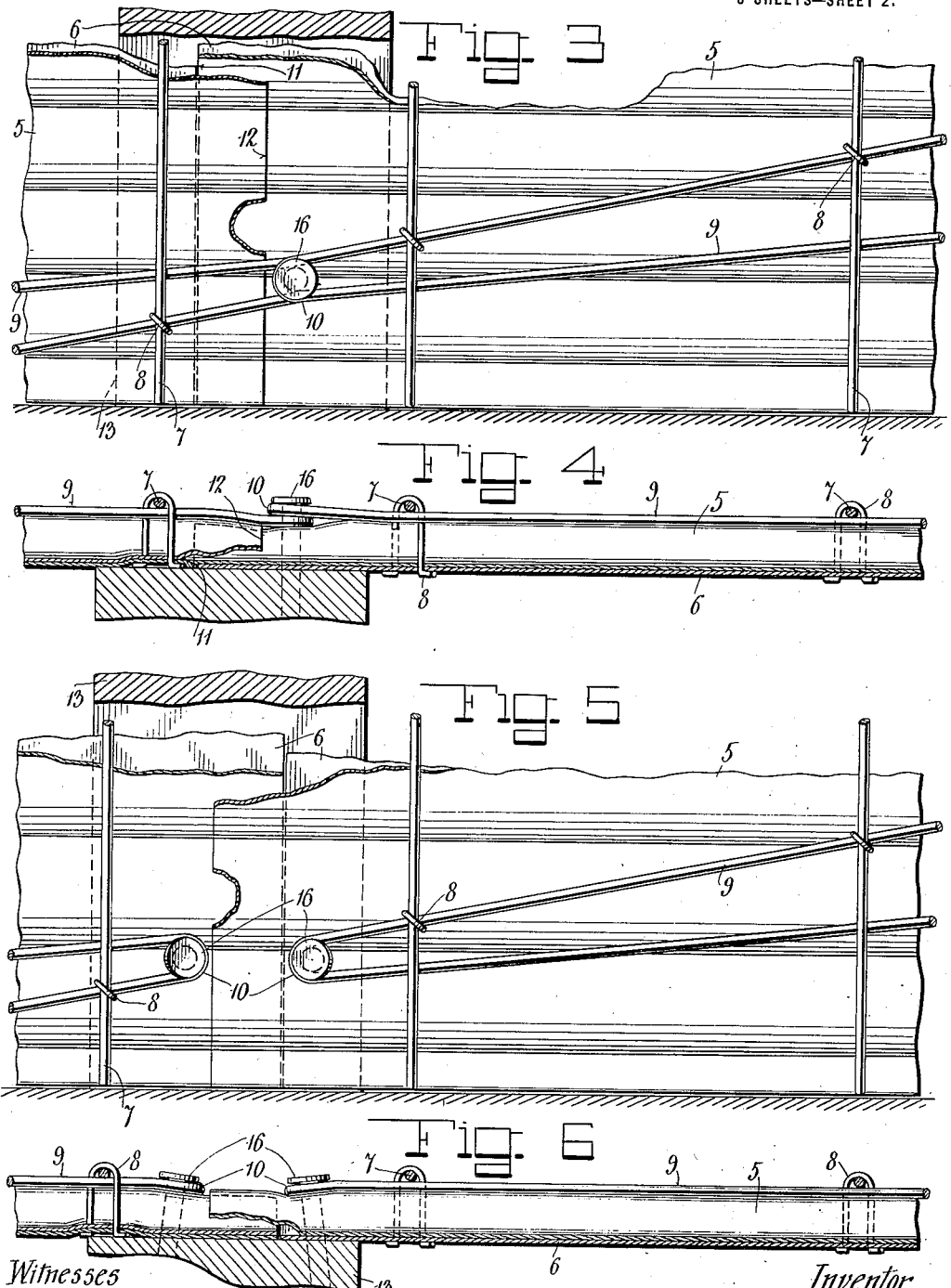

R. D. WEAKLEY.
KEY BASE FOR SIDE WALLS AND CEILINGS.
APPLICATION FILED MAY 11, 1912.
1,172,085.
Patented Feb. 15, 1916.
6 SHEETS—SHEET 3.
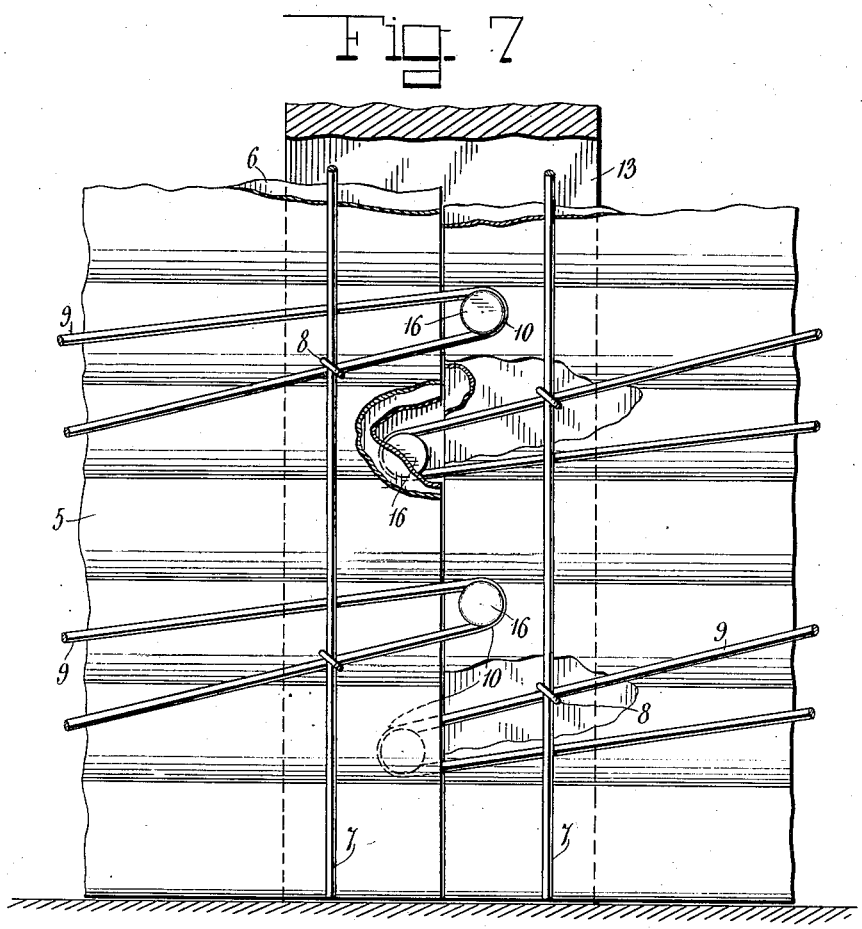
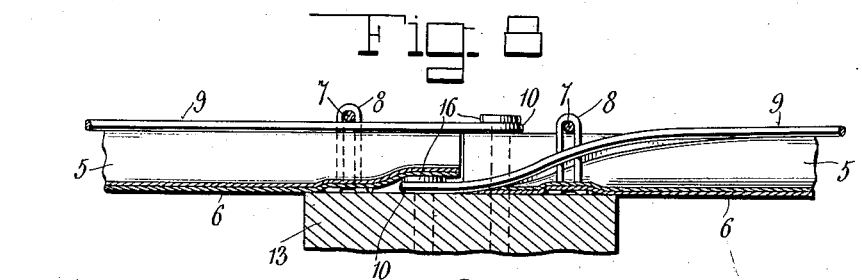
Witnesses
Inventor
Raymond D. Weakley,
Attorney

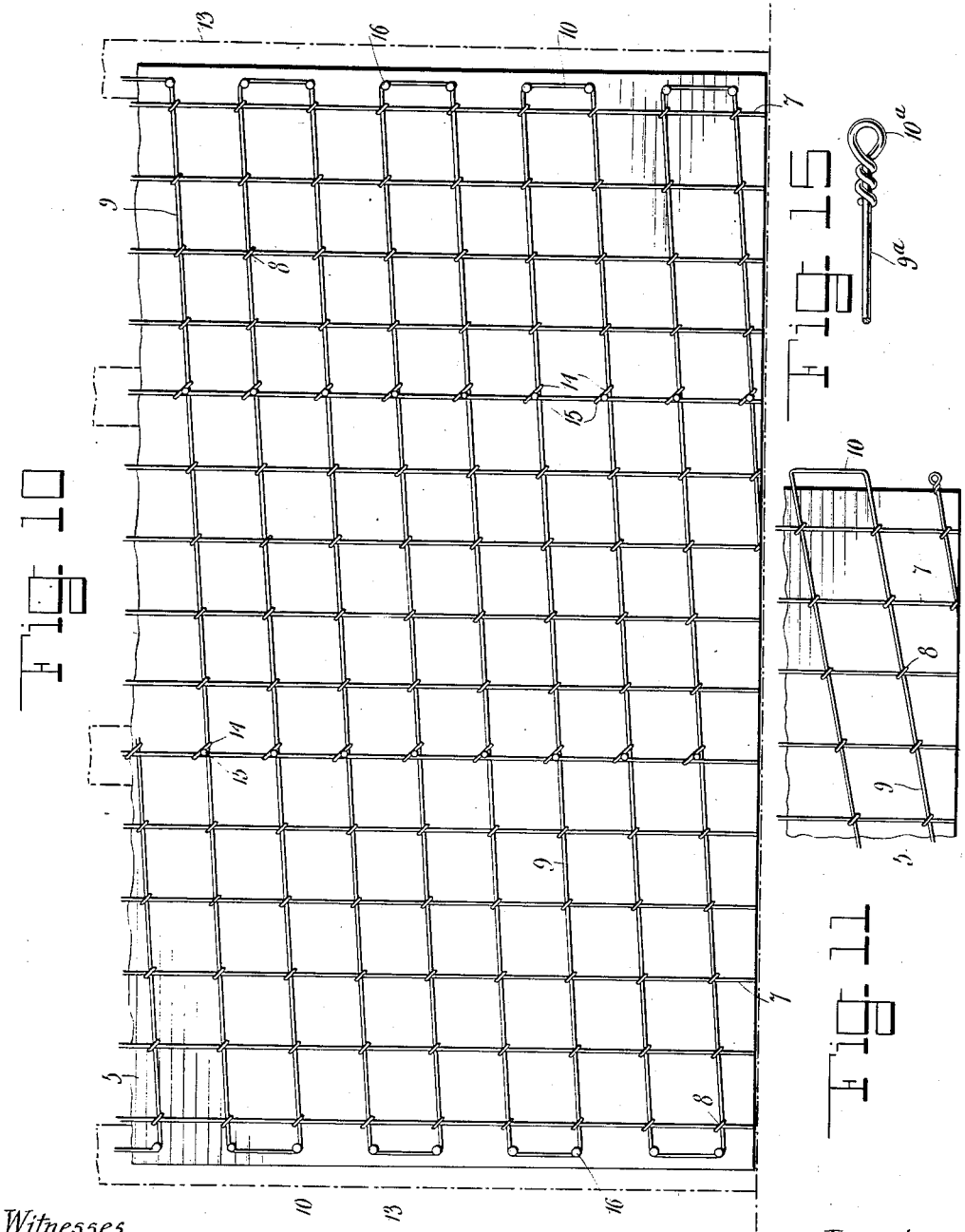

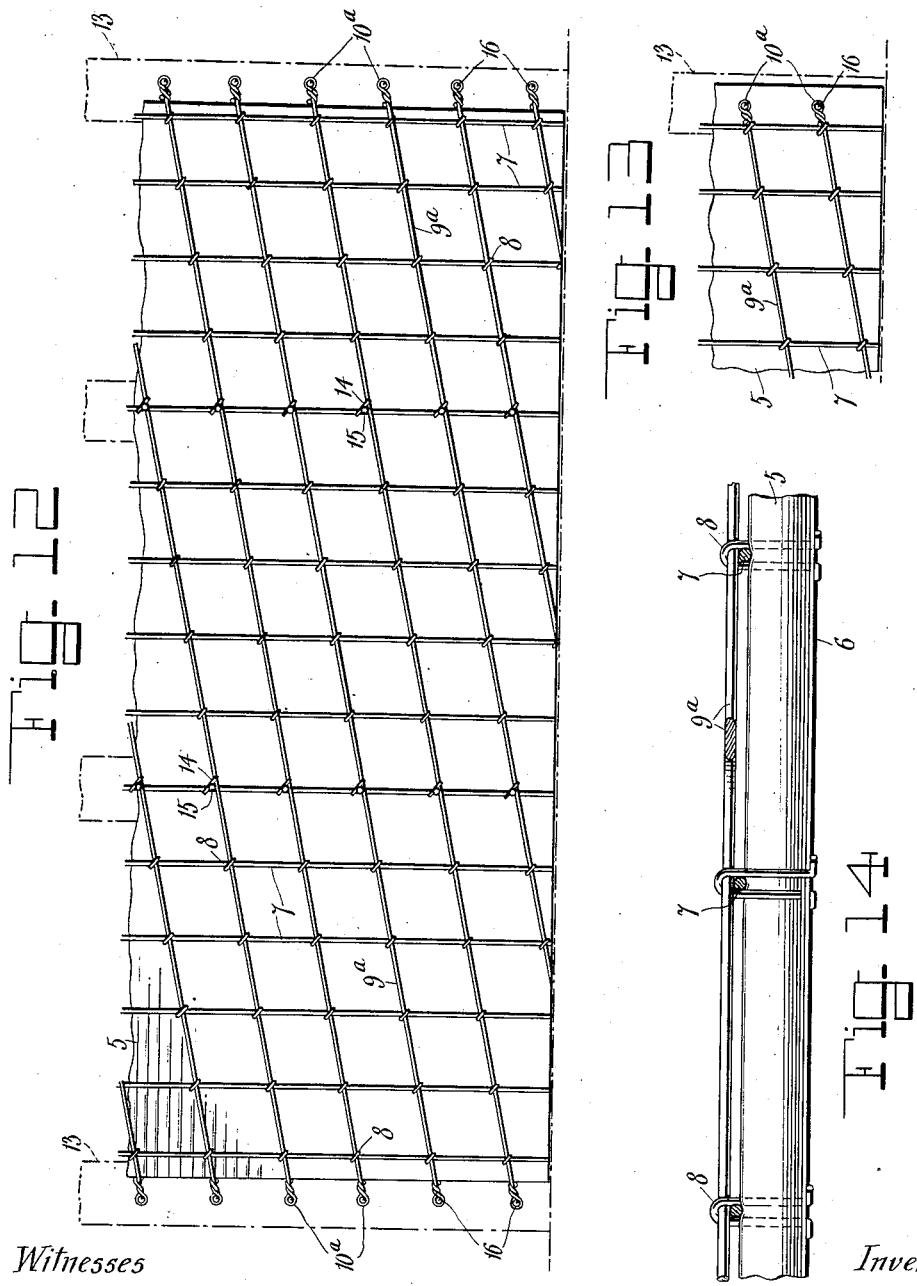

R. D. WEAKLEY.
KEY BASE FOR SIDE WALLS AND CEILINGS.
APPLICATION FILED MAY 11, 1912.

1,172,085.

Patented Feb. 15, 1916.
6 SHEETS—SHEET 6.

Witnesses
J. Jenkins
Chas. S. Hyer.

Inventor
Raymond D. Weakley,
Amos L. Norris
Attorney.

UNITED STATES PATENT OFFICE.

RAYMOND D. WEAKLEY, OF ST. LOUIS, MISSOURI, ASSIGNOR, BY DIRECT AND MESNE ASSIGNMENTS, TO PLASTIC PRODUCTS COMPANY, OF ST. LOUIS, MISSOURI, A CORPORATION OF MISSOURI.

KEY-BASE FOR SIDE WALLS AND CEILINGS.

1,172,085.

Specification of Letters Patent. Patented Feb. 15, 1916.

Application filed May 11, 1912. Serial No. 696,742.

*To all whom it may concern:*

Be it known that I, RAYMOND D. WEAKLEY, a citizen of the United States, residing at St. Louis, in the State of Missouri, have invented new and useful Improvements in Key-Bases for Side Walls and Ceilings, of which the following is a specification.

This invention relates to side wall and ceiling structures for building and other purposes, and particularly to means in the form of a key base for replacing the usual wood lath and plaster, metal laths or coverings and other expensive wall organizations now commonly used. Owing to the expensiveness of lime, lime plasters have been largely replaced by Portland and other analogous cements at a materially less cost, but in view of the fact that these cements cannot be practically applied to wood laths in view of the porous condition of the latter and their tendency to readily absorb water, together with the quick hardening characteristic of Portland cement plaster, buckling of the wood lath and a destruction of the cement by reason of the lath pushing through the said cement will result. In the use of metal laths of various types the expense is considerable, and a great waste of the ordinary plaster when applied to either wood or metal lath coverings or sheathings ensues by reason of the plaster being pressed between the wood laths or through the openings of the metal laths.

The present invention embodies features of improvement on the key base disclosed by my pending application Serial No. 654,061, filed October 11, 1911.

The object of this invention is not only to provide an economical covering or key base for side walls and ceilings of buildings to which cement plasters or reinforced concrete constructions may be directly applied and positively and firmly held, but also to give the covering embodying the improved key base and cement plaster or reinforced concrete a greater strength by setting up a compression and tension transversely of the key base in addition to the resisting tension established in a longitudinal direction relatively to the key base so that the plaster covering is firmly held with equal resistance against breakage or fracture in all directions over the key base surface.

With this object in view the invention in its improved form consists essentially in the use of corrugated paper that may be rendered water-proof by any suitable means and capable of being quickly applied to studding and rafters and having plaster holding or key means forming a part thereof and extending longitudinally as well as from side to side thereof.

The invention further consists of a corrugated sheathing or covering of any desirable width wherein the corrugations form reinforcing means in one direction combined with counter-reinforcing means at a positive angle to the corrugations and running in one direction in conjunction with auxiliary reinforcing means at an angle to said counter-reinforcing means and extending over the corrugations, the corrugations and the reinforcing means as a whole providing a key base for receiving and positively retaining cement plaster thereon.

The invention still further consists in the details of construction and arrangement of the several parts which will be more fully hereinafter described and claimed in preferred form.

In the drawings: Figure 1 is a sectional side elevation of a portion of a wall embodying the improved covering or key base and shown broken away in part. Fig. 2 is a horizontal section taken in the plane of the line 2—2, Fig. 1. Fig. 3 is an enlarged detail elevation of a portion of the wall and improved covering or key base. Fig. 4 is a horizontal section of the structure as shown by Fig. 3. Fig. 5 is a detail elevation of a portion of the wall support and covering showing a slight modification in the construction and arrangement of the parts. Fig. 6 is a horizontal section of the structure shown by Fig. 5. Fig. 7 is a sectional elevation of a portion of a support and the improved covering or key base embodying a further modification. Fig. 8 is a horizontal section through the structure shown by Fig. 7. Fig. 9 is a detail elevation on an enlarged scale showing the joint at the juncture of the intersecting key devices or means. Fig. 10 is a side elevation of a portion of a wall structure with the improved covering or key base applied thereto and embodying a still further modification and showing the transverse key wires disposed under the longitudinal key wires.

Figure 17:
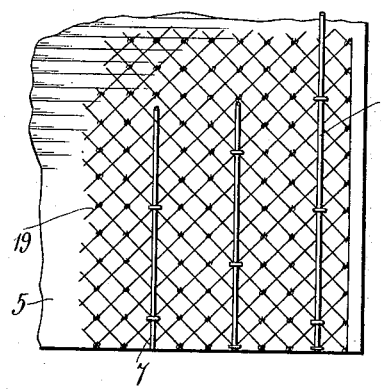
Figure 18:
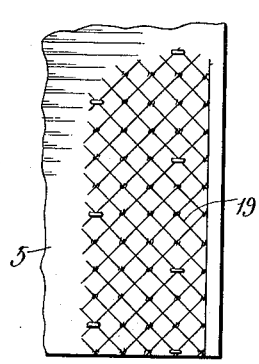
Figure 19:
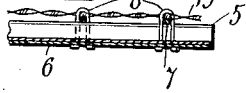
Figure 20:
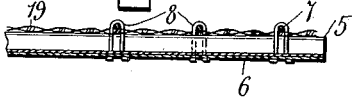
Figure 21:
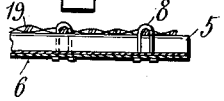
Figure 22:
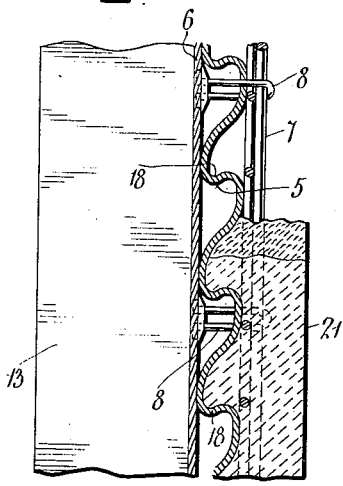
Figure 23:
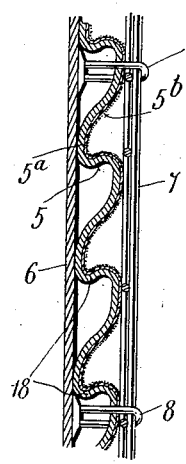

Fig. 11 is a detail elevation of a portion of the structure shown by Fig. 10 and showing the transverse key wires over the longitudinal key wires. Fig. 12 is a view similar to Fig. 10 showing a still further modification in the transverse key wires. Fig. 13 is a detail elevation of the structure shown by Fig. 12 illustrating a change in application of the transverse key wires. Fig. 14 is a horizontal section of a portion of the structure shown by Fig. 12. Fig. 15 is a detail view of a portion of one of the transverse key wires. Fig. 16 is a detail elevation showing the sheathing embodying longitudinal key wires and a woven wire fabric of open mesh arranged exteriorly of the longitudinal key wires. Fig. 17 is a view similar to Fig. 16 and embodying the same structure with the woven wire fabric under the longitudinal key wires. Fig. 18 is a detail elevation of a portion of the sheathing showing the use of the woven wire fabric without the longitudinal key wires or strands. Figs. 19, 20 and 21 are detail horizontal sections respectively of the structures shown by Figs. 16, 17 and 18. Fig. 22 is a transverse vertical section of a portion of the wall and sheathing with the cement plaster or coating thereon and particularly illustrating the corrugations slightly undercut, and which construction will be practically that embodied in all of the forms. Fig. 23 shows a detail transverse vertical section of the improved key base or lath without the wires and having the surface thereof covered with hot asphalt or other adhesive material and roughened with sand sprinkled thereover.

The numeral 5 designates a corrugated sheet which is preferably formed of paper or paper composition and comprises a backing 6 as a part thereof, as clearly shown by Fig. 8. The corrugated sheet 5 is materially strengthened by having the backing or backing sheet 6 glued or otherwise secured thereto, and, further, the backing sheet forms air spaces with the corrugated sheet and when plastered a wall is produced which is more proof to sound, heat, cold and dampness. The corrugated paper as a whole is of that character well known in the market or already prepared and used for packing purposes and in making boxes or other receptacles, and is freely flexible so that it may be easily rolled and unrolled without affecting its form or misshaping the corrugations.

Instead of the corrugated paper as just explained, tar paper may be used and suitably corrugated by running the same through or between fluted rollers. Both kinds of paper are comparatively inexpensive, but that first described embodying the backing 6 will be more largely used in carrying out the invention and may be rendered water-proof by applying thereto or saturating the same with any suitable waterproof material or compound, such for instance as paraffin, and in some instances a preservative or protective composition may be applied to this paper if desired, or the paper may be otherwise treated to render it fire-proof and more serviceable and effective in performing its desired function in accordance with the features of this invention, as for instance by covering the paper with hot asphalt and then sprinkling fine sand over the hot asphalt so that when dry a hard sand paper surface will be produced, and the sand will keep the paper from sticking when rolled up, and when paper is put up will form a better bond for cement or other plasters. This particular coating of the paper is shown by Fig. 23, the asphalt being indicated by $5^a$ and the sand by $5^b$. While this particular coating of the paper is unnecessary in all instances, it will be preferred and will be utilized in all the forms of the key base, wall covering or lathing which will be hereinafter explained. After the paper has been preliminarily treated or rendered water-proof, if the water-proofing preparation is found necessary, a plurality of wires 7 is appiled thereover by any suitable means and secured, these wires 7, as shown in the drawings, extending across the corrugations in planes at right angles to the latter and placed at regular or predetermined intervals, the said wires bridging the valleys between the convex portions of the corrugations. These wires are preferably formed of steel and have a suitable gage, and as one simple means of securing the same to the corrugated paper a number of staples 8 are applied thereover and upset against the sheet 6, for instance, or the rear portions of the corrugations.

As shown by Figs. 1 to 14, both inclusive, an auxiliary wire 9 is regularly associated with the wires 7 by being threaded or passed by any suitable means either over or under the said wires 7, the said wire 9 being first inserted in one direction and then returned and preferably continuous, as shown by Figs. 1 to 11, and consisting of single strands $9^a$, as shown by Figs. 12 to 14, the opposite terminals of the wire 9 being in the form of loops 10 which may be disposed inside or at a distance inwardly from the one edge 11 of each corrugated sheet or projected beyond the opposite edge 12 of the sheet, as shown by Figs. 1 and 3, or as shown by Fig. 5, the loops 10 may both terminate at a distance inwardly from the sheet edges, or as indicated by Fig. 7 the loops 10 may project beyond the sheet edges uniformly at both side edges of the sheet. The terminals of the wires $9^a$ are in the form of eyes $10^a$ which may be arranged similarly to the loops 10 in the various applications. The disposition of the loops 10 and eyes $10^a$ will be governed entirely by the particular use and application of the key base as a whole and in accordance with the desire of the user as to the manner of securing the side edges of the corrugated sheets and the said terminal loops 10 and eyes 10ª. The wires 9 are secured in part at least to the wires 7 and the corrugated sheet by the upset staples 8, as shown particularly by Figs. 1 and 3, and it is preferred that the said wires 9 and 9ª be also disposed at an angle to the corrugations of the sheet 5 and to the wires 7, the best results being derived from a diagonal arrangement of the wires 9 and 9ª as shown. At points throughout the width of each corrugated sheet 5 or where the wall studding 13 is engaged thereby, the staples 8 or other analogous fastening means are applied over the wires 7 and 9 and 9ª at a distance from the intersecting points of the latter as at 14, as shown enlarged by Fig. 9, to form openings for enlarged headed fastenings 15 so that when the said fastenings are driven into the studding 13 the heads thereof will firmly bear on the intersecting portions of the wires 7 and 9 and 9ª and the heads of the adjacent staples 8 and serve as an additional securing or binding means for the wires as well as a convenient means for setting the fastenings or in guiding the operator in applying the key base to the wall studding or the ceiling rafters, as the case may be. When the covering or key base in corrugated form having the wires 7, 9 and 9ª applied thereto as just explained has been completed, it is ready for use.

The improved invention embodying the covering or key base is not limited in its scope to any precise dimensions of the paper and wire, it being understood that the dimensions may be varied at will to meet different structural contingencies and applications. For all practical purposes, however, or for general usage it is proposed to have the corrugated paper manufactured in sheets about forty-eight inches wide and several hundred feet in length, and the wire used will be what is known as No. 18 steel wire with the staples 8 applied thereover approximately every three inches on center.

The covering or key base will be delivered in the market in rolls ready for application, and in view of the preferred width as just specified it will cover four studs or rafters or extend from the centers of the outer studs of rafters of each set of four rafters or studs, the latter being usually sixteen inches apart on center. The single diagonally arranged wire strands 9ª, as shown by Figs. 12, 13 and 14, may be applied over the longitudinal wires or strands 7, as shown particularly by Fig. 14, or under the said strands 7, as may be desired. In other words, the cross strands 9ª may be under or over the wires or strands 7 and the same arrangements may be adopted in the threaded strands 9, as illustrated by Figs. 1 to 11, both inclusive. In the form of the threaded strands shown by Figs. 10 and 11, the end loops 10 have a greater extent or are practically square in their contour and will be engaged by the fastenings as shown by Fig. 10. The corrugated sheets 5 bearing the wires or strands which produce with the corrugations the key base or the concrete plaster, may be overlapped at their edges a predetermined distance, as shown by Figs. 1 to 6, both inclusive, or arranged edge to edge, as illustrated by Figs. 7 and 8, and in the latter arrangement the loops 10 project beyond the side edges of the corrugated sheets, and the said loops of one sheet are covered by the side edge of the adjacent sheet. This variation in the arrangement of the sheet edges may be modified at will to accommodate different applications and uses of the key base or improved wall covering. The corrugations of the sheet 5 in practice will be undercut as at 18 so as to provide a firmer and more reliable support for the plaster coating, especially on side walls.

As shown by Figs. 16 and 17, a wire mesh fabric 19 is associated with the wires 7 and held intact with the corrugated sheet 5, this wire mesh fabric being what is known in the market as chicken wire, and in the arrangement illustrated by Figs. 16 and 19 the said wire mesh fabric is secured over the wires 7, and in the construction shown by Figs. 17 and 20 the wires 7 are secured over the wire mesh fabric 19. In Fig. 18 the wire mesh fabric 19 is shown applied and secured to the corrugated sheet 5 without the wires 7 and thereby illustrating that in some instances it may only be necessary to use the chicken wire or wire mesh fabric to accomplish the object sought. It is preferred, however, that the wires or wire strands 7 secured to the corrugated sheet 5 be used, as a stronger key base or wall covering is thereby produced.

From the foregoing it will be seen that the corrugated sheet which is preferably formed of paper may have either diagonal threaded wires associated with the wires 7 or single diagonal strand wires extending across the same and intersecting the said wires 7, or chicken wire or wire mesh fabric may be used with or without the wires 7, and a latticed or other suitable metallic lathing organization may be secured to the corrugated sheet. From this variation in arrangement of the parts of the improved wall covering it will be understood that the invention contemplates the use of a corrugated sheet having members or strands secured against the corrugations and disposed at angles to each other and adapted to be set up or applied to a wall structure at one operation and without requiring the members or strand wires to be stretched or otherwise arranged in view of the fact that the article will be complete and ready for use when placed upon the market.

It is also to be understood that the invention is not considered to be limited in the least to any one of the particular forms shown, but is comprehensive enough to include all of said forms.

In exterior work it is unnecessary for the builder to sheathe a building with lumber before applying the improved wall covering hereinbefore described, in view of the fact that the covering or key base after it has been plastered with cement mortar is just as strong as and takes the place of wood sheathing.

In applying the covering or key base to studs or rafters the one end of each sheet is secured to the floor plate or the ceiling beam or plate, as the case may be, and gradually unrolled and attached by driving fastenings through the edges, as at 16. The edges of the sheets 5 are overlapped as shown by Figs. 1, 3 and 5, and the terminal loops 10 of the wires 9 inwardly at a distance from the one edge of each sheet may be overlapped by the similarly arranged loops 10 of the adjacent sheet, as shown by Fig. 1, and the fastenings 16 then inserted through the overlapped terminal loops, it being understood that the terminal loops 10 at one side edge of the sheet extend beyond said sheet edge so as to project over the adjacent sheet edge and overlap the loops at a distance inwardly from the latter sheet edge. Where the terminal loops 10 terminate inwardly from the side edges of the sheets, as shown by Fig. 5, there are two lines of fastenings 16 engaging each stud and said fastenings are slightly inclined so as to set up a drawing action on the wire loops 10, as shown by Fig. 6. At points where the studs or rafters are provided with connecting bridge strips or reinforces, other similar fastenings will be applied to the wires or driven over the latter and through the corrugated paper into the said strips or reinforces. This same operation may be pursued with the remaining forms of the covering or key base, and the edges of the sheets may be associated as desired. By fastening the corrugated sheets and wires to the studs or rafters as explained, a very strong application or securement will result, with material advantages in maintaining the covering or key base in position on the wall and in resisting the weight strain of the cement plaster applied thereto. It will be seen that owing to the width of the corrugated covering or key base, a large area may be quickly sheathed therewith, and as the cost of the improved covering or key base is materially less than the cheapest plaster holding means now used for a similar purpose, the expense of construction of certain classes of residences or buildings will be correspondingly reduced without in the least impairing the necessary strong support for the plaster covering of walls and ceilings. As the improved covering or key base is imperforate, the cement plaster will not be wasted by pushing through the same and falling within the wall or between the opposite coverings of the wall as in the case where a lath key base or a perforated metal key base is employed.

As shown particularly by Fig. 8, the cement plaster covering or coating 21 is applied over the sheathing or key base after the latter is secured to the studs or rafters of a wall or ceiling and is pressed into the valleys of the corrugations and under, over and between the wires 8 and 9 and the corrugations. The cement plaster fully encloses all the parts of the improved covering or key base and will be firmly and reliably held in all directions by reason of the formation of the corrugations and the relative positions of the wires or intersecting members, and though the paper should break in the course of time, the plaster covering will still be firmly sustained in place by the wires or members, and a tension is not only set up longitudinally of the covering on the cement plaster covering or coating by the wires 7, but at the same time the intersecting wires give the said covering or coating a tension which will resist any tendency to fracture or breakage of the covering or coating transversely of the key base or of the wall. The corrugations, as hereinbefore noted, are undercut or lean to one side or in one direction, and it is therefore better to have the covering or key base applied to a side wall with the corrugations pointing upwardly instead of downwardly so as to form a stronger and more positive supporting means for the cement plaster covering or coating. The cement plaster or covering is applied over the key base or sheathing in the same manner as ordinary lime plaster and is generally about a quarter of an inch thick, and within four or five hours this plaster becomes thoroughly set and presents a strong, solid, stony surface to receive the second and third coats of plaster. It will be observed that the wires 7 all run parallel to the studding or ceiling rafters, and those wires which are securely fastened to the studding or rafters create a bond between the latter and the wires running thereover and including the wires intersecting the wires 7, so that when the plaster is applied it will be almost impossible to separate the plaster panels from the studding or ceiling rafters without first breaking the wires or pulling out the fastening means engaging the same and the studding and rafters. In other words, the wall or ceiling when completed will be practically indestructible, and if the plaster becomes broken by more than ordinary stress imposed thereon the steel wires or intersecting members will hold the plaster together and the break can be easily replastered.

By means of the structure herein specified a fire-proof plaster covering is produced at a comparatively small expense and of a very durable nature.

One of the most essential advantages of the structure is that all the wires or key members are simultaneously applied with the corrugated paper to the studding or rafters, or in other words, the sheathing or key base is complete in itself and does not require several manipulations of separate parts to practically apply the same at the time that the key base is secured to the studding or rafters.

What is claimed is:

1. A covering or key base for walls and ceilings, consisting of a flexible corrugated sheet of paper material having wires secured thereon and extending diagonally across the same throughout the length and width thereof and in regular interstitial relation, and longitudinal wires also extending over the corrugations of the sheet and both wires standing clear of the depressions between the corrugations and forming diversified angular key means relatively to the sheet, both the diagonally arranged and longitudinal wires being located on one side only of the corrugated sheet of paper and the longitudinal wires secured to the latter at intervals throughout the length of said wires, the fastenings for the longitudinal wires also securing the diagonal wires at the points of intersection of the latter with the longitudinal wires.

2. A covering or key base for walls and ceilings, consisting of a flexible sheet of corrugated paper material having corrugations extending fully and continuously thereover in a transverse direction, wire members extending in diagonal planes transversely thereof and angularly crossing the corrugations, longitudinal wire members intersecting the diagonal wire members and disposed in planes at right angles to the corrugations of the sheet, the diagonal and longitudinal wire members all being on one side only of the flexible sheet, and fastening devices secured over the points of intersection of the said diagonal and longitudinal wire members at intervals and also to the said sheet to hold the latter and the members primarily intact, the diagonal wire members being continuous and forming key means over the valleys between the corrugations of the sheet.

3. A covering or key base for walls and ceilings, consisting of a flexible piece of paper material comprising a flat backing sheet and a corrugated sheet secured to one side of the backing sheet and adapted to be rolled and unrolled, main wires secured against and extending longitudinally of the sheet and at right angles to and over the corrugations to provide key spaces between the wires and valleys of the corrugations, auxiliary wires passed over the sheet and disposed in diagonal relation to the sheet and to the main wires and also at diagonal angles to the corrugations and continuing across the sheet from one side to the other, the auxiliary diagonal wires forming additional key means relatively to the valleys between the corrugations, both the main and auxiliary wires being applied to one side only of the sheet, and means for fastening the main wires and portions of the auxiliary wires to the sheet at the points of intersection of the main and auxiliary wires prior to the application of the latter to a wall or ceiling, all of the wires being exposed on one side of the sheet over the corrugations, the said sheet being of imperforate structure.

4. A covering or key base for walls and ceilings, consisting of an imperforate flexible flat backing sheet and a corrugated sheet of paper material secured against one side of the backing sheet, and key wires extending both longitudinally and transversely in diagonal planes over the outer side of the corrugated sheet and at angles to the corrugations of the latter sheet, the wires being primarily fixed to the corrugated and backing sheets, the diagonal wires being projected at opposite sides beyond the longitudinal wires and provided with means for securing the same to a support.

5. A covering or key base for walls and ceilings, consisting of a flexible sheet of imperforate paper material, comprising a flat backing sheet and an outer corrugated sheet secured to one side of the backing sheet and key wires extending longitudinally and also transversely in diagonal planes at varying angles to the corrugations of the said outer sheet, the wires extending diagonally of the outer sheet having looped terminals for interlocking association with similar wires of adjacent sheets, all the wires being primarily fixed to the backing and outer corrugated sheets and simultaneously applicable with the latter.

6. A key base for walls and ceilings, consisting of a flat backing sheet on which is secured an outer sheet having corrugations extending over the surface thereof provided with an exterior coating of asphalt and sand, and key wires secured to and bearing against the corrugations and disposed at various angles to the latter.

7. A key base for walls and ceilings, consisting of a flat backing sheet and a front sheet secured thereto and provided with corrugations having their apices bent to provide undercuts, the corrugations extending over the surface of the outer sheet to form each corrugation with an overhanging key portion, and intersecting wire strands secured to the sheets and engaging the corrugations, the wire strands being disposed at longitudinal and diagonal angles to the corrugations and bridging the valleys between the said corrugations.

8. A key base for walls and ceilings, consisting of a piece of paper comprising a flat backing sheet and an outer sheet secured thereto and having undercut corrugations extending transversely over the surface thereof to form each corrugation with an overhanging key portion, and intersecting longitudinal and diagonal wire strands secured on the exterior of the flexible material and engaging and crossing the corrugations, a portion of the wire strands crossing the corrugations at right angles to the latter.

In testimony whereof I have hereunto set my hand in presence of two subscribing witnesses.

RAYMOND D. WEAKLEY.

Witnesses:
GEORGE R. WALZ,
A. R. ROADES.